(12) United States Patent
Khandani

(10) Patent No.: US 9,763,104 B2
(45) Date of Patent: Sep. 12, 2017

(54) DISTRIBUTED COLLABORATIVE SIGNALING IN FULL DUPLEX WIRELESS TRANSCEIVERS

(71) Applicant: Amir Keyvan Khandani, Kitchener (CA)

(72) Inventor: Amir Keyvan Khandani, Kitchener (CA)

( * ) Notice: Subject to any disclaimer, the term of this patent is extended or adjusted under 35 U.S.C. 154(b) by 34 days.

(21) Appl. No.: 13/893,299

(22) Filed: May 13, 2013

(65) Prior Publication Data

US 2013/0301484 A1 Nov. 14, 2013

Related U.S. Application Data

(60) Provisional application No. 61/646,312, filed on May 13, 2012, provisional application No. 61/771,815, filed on Mar. 2, 2013.

(51) Int. Cl.
*H04B 7/00* (2006.01)
*H04W 16/14* (2009.01)
(Continued)

(52) U.S. Cl.
CPC ............ *H04W 16/14* (2013.01); *H04B 1/123* (2013.01); *H04B 1/525* (2013.01); *H04B 7/026* (2013.01); *H04B 7/0413* (2013.01); *H04B 7/0478* (2013.01); *H04L 1/18* (2013.01); *H04L 1/1825* (2013.01); *H04L 1/1896* (2013.01); *H04L 5/14* (2013.01); *H04W 12/04* (2013.01);
(Continued)

(58) Field of Classification Search
CPC ........... H04L 5/14; H04L 5/16; H04L 5/0032; H04W 16/14

USPC .......................................................... 370/277
See application file for complete search history.

(56) References Cited

U.S. PATENT DOCUMENTS 4,268,727 A * 5/1981 Agrawal ............... H04Q 11/04
                                                379/406.08
4,750,165 A * 6/1988 Champagne et al. ........ 370/276
(Continued)

FOREIGN PATENT DOCUMENTS

GB     1091437     11/1967
JP     10502220 A     2/1998
(Continued)

OTHER PUBLICATIONS

International Search Report for PCT/US2013/040822 mailed Jul. 18, 2013.
(Continued)

*Primary Examiner* — Derrick Ferris
*Assistant Examiner* — Abdeltif Ajid
(74) *Attorney, Agent, or Firm* — Invention Mine LLC

(57) ABSTRACT

Two-way (full-duplex) wireless links in facilitating network management and improve network performance. Once aspect includes methods for network management using an overlaid network for control signaling. Another aspects include methods to facilitate practical realization and improve performance of some of the network information theoretic configurations, such as Space-Division Multiple Access (SDMA) in uplink and downlink, Interference Channel, and other forms of distributed collaborative signaling schemes. Another aspect includes methods to support cognitive wireless networks.

6 Claims, 6 Drawing Sheets

(51) Int. Cl.
*H04B 7/0413* (2017.01)
*H04L 5/14* (2006.01)
*H04W 12/04* (2009.01)
*H04B 7/04* (2017.01)
*H04B 7/026* (2017.01)
*H04B 1/12* (2006.01)
*H04B 1/525* (2015.01)
*H04L 1/18* (2006.01)
*H04B 7/0417* (2017.01)
*H04B 7/06* (2006.01)
*H04B 7/10* (2017.01)
*H04L 1/00* (2006.01)

(52) U.S. Cl.
CPC .......... *H04B 7/0417* (2013.01); *H04B 7/0626* (2013.01); *H04B 7/0669* (2013.01); *H04B 7/10* (2013.01); *H04L 2001/0097* (2013.01)

(56) References Cited

U.S. PATENT DOCUMENTS

| | | | |
|---|---|---|---|
| 5,383,224 | A | 1/1995 | Mizoguchi |
| 5,691,978 | A | 11/1997 | Kenworthy |
| 6,608,864 | B1 | 8/2003 | Strait |
| 6,621,876 | B2 | 9/2003 | Camp, Jr. |
| 6,917,597 | B1 | 7/2005 | Schmidl |
| 7,002,518 | B2 | 2/2006 | Lin |
| 7,065,036 | B1 | 6/2006 | Ryan |
| 7,091,894 | B2 | 8/2006 | Fudge |
| 7,096,042 | B2 | 8/2006 | Marinier |
| 7,184,466 | B1 | 2/2007 | Seemann |
| 7,187,907 | B2 | 3/2007 | Widrow |
| 7,221,688 | B2 | 5/2007 | Vanness |
| 7,272,366 | B2 | 9/2007 | Haapoja |
| 7,346,100 | B2 | 3/2008 | Kumar |
| 7,482,058 | B2 | 1/2009 | Ahmed |
| 7,627,325 | B2 | 12/2009 | McCoy |
| 7,693,174 | B2 | 4/2010 | Ishibashi |
| 7,706,744 | B2 | 4/2010 | Rodgers |
| 7,817,641 | B1* | 10/2010 | Khandani ............ H04B 7/0682 370/395.4 |
| 7,920,539 | B2 | 4/2011 | Stanford |
| 7,944,871 | B2 | 5/2011 | Imamura |
| 7,991,160 | B2 | 8/2011 | Guccione |
| 8,023,438 | B2 | 9/2011 | Kangasmaa |
| 8,031,744 | B2 | 10/2011 | Radunovic |
| 8,064,502 | B2 | 11/2011 | Sawai |
| 8,107,906 | B2 | 1/2012 | Lum |
| 8,175,535 | B2 | 5/2012 | Mu |
| 8,208,628 | B2 | 6/2012 | Yener |
| 8,238,551 | B2 | 8/2012 | Reznik |
| 8,280,046 | B2 | 10/2012 | Rudolf |
| 8,306,480 | B2 | 11/2012 | Muhammad |
| 8,351,874 | B2 | 1/2013 | Dent |
| 8,373,582 | B2 | 2/2013 | Hoffberg |
| 8,401,196 | B2 | 3/2013 | Goldberg |
| 8,498,585 | B2 | 7/2013 | Vandenameele |
| 8,628,650 | B2 | 1/2014 | Ah |
| 8,629,650 | B2 | 1/2014 | Mohammadian |
| 8,744,377 | B2 | 6/2014 | Rimini |
| 8,767,869 | B2 | 7/2014 | Rimini |
| 8,837,615 | B2* | 9/2014 | Baldemair ......... H04B 7/15585 375/211 |
| 8,897,269 | B2 | 11/2014 | Ji |
| 8,918,692 | B2 | 12/2014 | Braithwaite |
| 8,976,641 | B2 | 3/2015 | Choi |
| 9,036,749 | B2 | 5/2015 | Choi |
| 9,054,795 | B2 | 6/2015 | Choi |
| 9,071,313 | B2 | 6/2015 | Monsen |
| 9,077,421 | B1 | 7/2015 | Mehlman |
| 9,130,693 | B2 | 9/2015 | Reznik |
| 9,276,682 | B2 | 3/2016 | Bharadia |
| 2002/0032004 | A1 | 3/2002 | Widrow |
| 2003/0114128 | A1* | 6/2003 | Haapoja ............ H04B 1/0475 455/307 |
| 2003/0189975 | A1 | 10/2003 | Fullerton |
| 2004/0022229 | A1 | 2/2004 | Vanness |
| 2005/0057420 | A1 | 3/2005 | Lin |
| 2005/0083863 | A1 | 4/2005 | Umei |
| 2005/0275576 | A1 | 12/2005 | Fudge |
| 2006/0045063 | A1* | 3/2006 | Stanford ............ H04W 84/16 370/345 |
| 2007/0026804 | A1* | 2/2007 | Ishibashi .......... H04W 74/0825 455/63.1 |
| 2007/0036353 | A1 | 2/2007 | Reznik |
| 2007/0063875 | A1 | 3/2007 | Hoffberg |
| 2007/0082617 | A1* | 4/2007 | McCallister ........ H04B 1/0475 455/63.1 |
| 2007/0254692 | A1* | 11/2007 | McCoy .................. H04B 1/38 455/553.1 |
| 2008/0009257 | A1 | 1/2008 | Safarian |
| 2008/0107046 | A1 | 5/2008 | Kangasmaa |
| 2008/0123851 | A1 | 5/2008 | Guccione |
| 2009/0092072 | A1* | 4/2009 | Imamura ........... H04B 7/15542 370/315 |
| 2009/0141900 | A1 | 6/2009 | Ye |
| 2009/0186582 | A1 | 7/2009 | Muhammad |
| 2009/0213770 | A1 | 8/2009 | Mu |
| 2009/0253385 | A1 | 10/2009 | Dent |
| 2009/0284218 | A1 | 11/2009 | Mohammadian |
| 2010/0008406 | A1 | 1/2010 | Sawai |
| 2010/0020771 | A1 | 1/2010 | Ji |
| 2010/0022201 | A1 | 1/2010 | Vandenameele |
| 2010/0086012 | A1 | 4/2010 | Rofougaran |
| 2010/0232324 | A1* | 9/2010 | Radunovic ............ H04L 12/413 370/277 |
| 2010/0248714 | A1* | 9/2010 | Kang et al. ................... 455/427 |
| 2010/0271987 | A1 | 10/2010 | Chiu |
| 2011/0149714 | A1 | 6/2011 | Rimini |
| 2012/0087424 | A1 | 4/2012 | Brown |
| 2012/0159279 | A1* | 6/2012 | Braithwaite ........ H04W 84/047 714/751 |
| 2012/0200158 | A1 | 8/2012 | Takei |
| 2012/0201153 | A1 | 8/2012 | Bharadia |
| 2012/0201173 | A1* | 8/2012 | Jain ........................ H04B 1/525 370/277 |
| 2012/0281834 | A1 | 11/2012 | Reznik |
| 2012/0300680 | A1* | 11/2012 | Pietsch .............. H04B 7/15557 370/279 |
| 2013/0010851 | A1 | 1/2013 | Jaeger |
| 2013/0044791 | A1* | 2/2013 | Rimini .................. H04B 1/109 375/219 |
| 2013/0089009 | A1* | 4/2013 | Li ....................... H04L 27/2601 370/278 |
| 2013/0102254 | A1* | 4/2013 | Cyzs .................... H04B 1/126 455/63.1 |
| 2013/0286903 | A1* | 10/2013 | Khojastepour ........... H04L 5/14 370/280 |
| 2013/0301487 | A1 | 11/2013 | Khandani |
| 2014/0126675 | A1 | 5/2014 | Monsen |
| 2014/0135056 | A1 | 5/2014 | Wang |
| 2014/0169236 | A1 | 6/2014 | Choi |
| 2014/0204808 | A1 | 7/2014 | Choi |
| 2014/0219139 | A1 | 8/2014 | Choi |
| 2015/0043323 | A1 | 2/2015 | Choi |
| 2015/0043685 | A1 | 2/2015 | Choi |
| 2015/0049834 | A1 | 2/2015 | Choi |
| 2015/0063176 | A1 | 3/2015 | Hong |
| 2015/0078217 | A1 | 3/2015 | Choi |
| 2015/0139284 | A1 | 5/2015 | Choi |
| 2015/0171903 | A1 | 6/2015 | Mehlman |
| 2015/0188646 | A1 | 7/2015 | Bharadia |
| 2015/0236750 | A1 | 8/2015 | Choi |
| 2015/0263780 | A1 | 9/2015 | Mehlman |
| 2015/0280893 | A1 | 10/2015 | Choi |
| 2015/0333847 | A1 | 11/2015 | Bharadia |
| 2015/0341125 | A1 | 11/2015 | Bharadia |

FOREIGN PATENT DOCUMENTS

| | | |
|---|---|---|
| KR | 1020040096404 | 11/2004 |
| KR | 1020070072629 | 7/2007 |
| KR | 1020120080231 | 7/2012 |

(56) References Cited

FOREIGN PATENT DOCUMENTS

| WO | 9622643 | 7/1996 |
|---|---|---|
| WO | 2011065020 | 6/2002 |
| WO | 03098823 | 11/2003 |
| WO | 030398823 | 11/2003 |
| WO | 2010005951 | 1/2010 |
| WO | 2011148341 | 12/2011 |

OTHER PUBLICATIONS

Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664, XP032085749, DOI: 10.1109/ALLERTON.2011.6120368, ISBN: 978-1-4577-1817-5.
Vaze, R., et al., "To Code or Not to Code in Multi-Hop Relay Channels", Arxiv.org, Cornell University Library, May 20, 2008, XP080418936, 30 pages.
International Search Report for PCT/US2013/040818 mailed Jul. 24, 2013.
Jung II, ., "Achieving single channel, full duplex wireless communication", Proceedings from the Annual International Conference on Mobile Computing and Networking, MOBICOM—MOBICOM' and MOBIHOC'10—Proceedings of the 16th Annual International Conference on Mobile Computing and Networking and 11th ACM International Symposi, Sep. 20, 2010, pp. 1-12, XP002696691.
EP Extended European Search Report for EP App. No. 13790076.7, dated Mar. 2, 2016, 8 pages.
Extended European Search Report for EP App. 13790948.7, dated Nov. 4, 2015, 9 pages.
Provisional Application, entitled: "Tuning Algorithm for Multi-Tap Signal Cancellation Circuit", U.S. Appl. No. 61/754,447, filed Jan. 18, 2013.
Provisional Application, entitled: "Signal Cancellation Using Feedforward and Feedback", U.S. Appl. No. 61/760,518, filed Feb. 4, 2013.
Provisional Application, entitled: "Feed Foward Signal Cancellation", U.S. Appl. No. 61/736,726, filed Dec. 13, 2012.
Jain, M., "Practical, Real-Time, Full Duplex Wireless", MobiCom '11, Sep. 19-23, 2011, Las Vegans, NC, USA, 2011, 12 pages.
International Search Report and Written Opinion for PCT/US2014/042136 mailed on Dec. 9, 2014.
Provisional Application, entitled: "Adaptive Non-Linear Digital Cancellation for Full-Duplex Radios", U.S. Appl. No. 61/864,453, filed Aug. 9, 2013.
Provisional Application, entitled: "Cancellation Circuit With Variable Delay and Amplifier", U.S. Appl. No. 61/876,663, filed Sep. 11, 2013.
Provisional Application, entitled: "Frequency Independent Analog Cancellation Circuit", U.S. Appl. No. 61/864,459, filed Aug. 9, 2013.
Provisional Application, entitled: "Hybrid IF/RF Digital Cancellation Architectures for Full-Duplex Radios", U.S. Appl. No. 61/915,431, filed Dec. 12, 2013.
Provisional Application, entitled: "Method and Apparatus for Mitigating Phase Noise to Improve Self-Interference Cancellation", U.S. Appl. No. 61/865,943, filed Aug. 14, 2013.
Provisional Application, entitled: "Near Band Cancellation", U.S. Appl. No. 61/970,852, filed Mar. 26, 2014.
Provisional Application, entitled: "Self Interference Cancellation Architecture for In-Band Full Duplex Relay Node", U.S. Appl. No. 61/871,519, filed Aug. 29, 2013.
Provisional Application, entitled: "Techniques for Digital Interference Cancellation", U.S. Appl. No. 62/002,578, filed May 23, 2014.
Provisional Application, entitled: "Tunable Self Interference Cancellation", U.S. Appl. No. 61/950,742, filed Mar. 10, 2014.
Provisional Application, entitled: "Interference Cancellation Architectures With Frequency Isolation", U.S. Appl. No. 62/030,240, filed Jul. 29, 2014.
International Search Report and Written Opinion for PCT/US2014/051137 mailed Nov. 24, 2014.
McMichael, J. G., et al., "Optimal tuning of analog self-interference cancellers for full-duplex wireless communication". IEEE, Fiftieth Annual Allerton Conference, Oct. 1-5, 2012, p. 246-251.
International Search Report and Written Opinion from PCT/US2014/050968 mailed on Nov. 19, 2014.
Persson, D., et al., "Joint Source-Channel Coding for the MIMO Broadcast Channel", IEEE Transactions on Signal Processing, vol. 60, No. 4, Apr. 2012, pp. 2085-2090.
Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443.
EP Extended Search Report for EP App. No. 13790160.9-1874, dated Jan. 16, 2016, 9 pages.

\* cited by examiner

DISTRIBUTED COLLABORATIVE SIGNALING IN FULL DUPLEX WIRELESS TRANSCEIVERS

CROSS-REFERENCE TO RELATED APPLICATIONS

The present application is a non-provisional filing of, and claims benefit under 35 U.S.C. §119(e) from, U.S. Provisional Patent Application Ser. No. 61/646,312, filed May 13, 2012, and U.S. Provisional Patent Application Ser. No. 61/771,815, filed Mar. 2, 2013, both of which are hereby incorporated herein by reference. In addition, this application is related to the following applications, all of which are also incorporated herein by reference: U.S. application Ser. No. 13/893,298, entitled Full Duplex Wireless Transmission with Self-Interference Cancellation, filed on May 13, 2013, U.S. application Ser. No. 13/893,296, entitled Wireless Transmission with Channel State Perturbation, filed May 13, 2013, U.S. application Ser. No. 13/893,297, entitled Full Duplex Wireless Transmission with Channel Phase-Based Encryption, filed May 13, 2013.

FIELD

The present disclosure relates to wireless communications. In particular, the present disclosure relates to systems and methods using two-way (full-duplex) wireless links.

BACKGROUND OF THE INVENTION

A communication link (e.g. between node A and node B) with the capability to support the connection in both directions at the same time is called full-duplex, or two-way. In contrast, a link that can support the connection in only one direction at a time is called one-way or half-duplex.

Current wireless systems are one-way and rely on either separate time slots (Time Division Duplex, TDD) or separate frequency bands (Frequency Division Duplex, FDD) to transmit and to receive. These alternatives have their relative pros and cons, but both suffer from lack of ability to transmit and to receive simultaneously and over the entire frequency band. Full-duplex capability is particularly useful when several wireless nodes share a frequency band, as it helps in managing the impact of multi-user interference, maximizing spectral efficiency, and improving network quality of service.

Point-to-point communications primarily concerns transmission between a single transmitter and a single receiver, while networking concerns scenarios where more than two users share the channel. The impact of full-duplex links in point-to-point communications is limited to doubling the rate by providing two symmetrical pipes of data flowing in opposite directions. This affects the point-to-point throughput with no direct impact on networking. In contrast, in multi-user wireless systems, due to the nature of transmission that everyone hears everyone else, full-duplex capability provides new ways to facilitate sharing of a common spectrum.

A basic feature of wireless transmission is that the transmission media is shared among all users and everyone hears everyone else. This feature can cause harmful effects in terms of multi-user interference and normally necessitates sophisticated network management. Full-duplex capability with support for asynchronous clients provides the means to benefit from the same basic feature of wireless transmission and facilitate network management.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
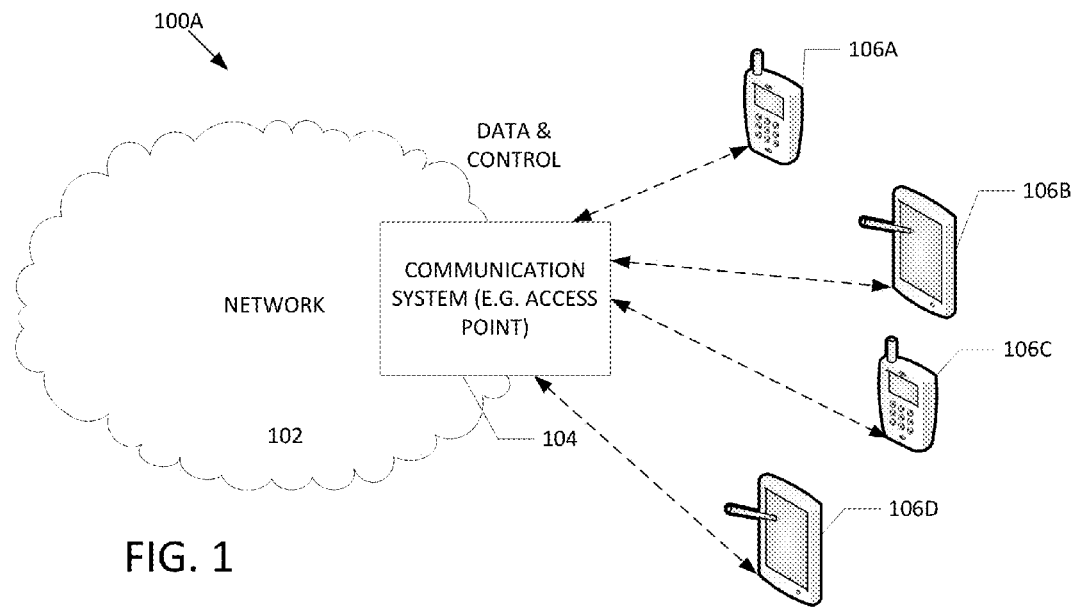
FIGS. 1 and 2 show block diagrams of a communication network in which an access point (AP) is communicating with multiple clients with full-duplex links to each client and where the access point of FIG. 2 communicates with multiple clients using OFDMA for sharing the bandwidth among users with full-duplex link over OFDM tone and with support for multiple transmit and multiple receive antennas.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods are disclosed to benefit from full-duplex capability to simplify practical implementation of network structures, simplify network management, or improve network performance. This includes a traditional network structure, as well as some basic information theoretic setups, such as space division multiple access (SDMA) in down-link (MIMO broadcast) and in the uplink (MIMO multiple access), cooperative signaling towards reducing multi-user interference, and interference channel. The methods mat be explained in terms of using OFDMA for multi-user multiplexing, similar concepts are applicable to other means of multi-user multiplexing, such as CDMA, TDMA and SDMA.

Cognitive transmission is a method to improve spectral efficiency of wireless networks by allowing secondary users to transmit over a spectrum primarily assigned to some primary users as long as the negative side effect on the primary users in managed. One example is the case of sharing a licensed spectrum with un-licensed users, which are allowed to transmit subject to causing zero or minimal interference to the licensed users. In conventional half-duplex networks, it is difficult to manage such a sharing of spectrum, as nodes inherently cannot listen which transmitting. Even in FDD systems, although users can listen while transmitting, they will not be able to manage the impact of their transmission on the reception of the other users in the network as reception and transmission are not in the same frequency band. This can be further generalized to scenarios in which there are several classes of QoS, corresponding to several classes of users, or to different types of data within the same class, e.g., depending on delay sensitivity of data or being emergency information. This disclosure includes strategies to handle the above scenarios. Primary users, or users sending data of a higher QoS requirement, send a signature signal which will be immediately detected by the secondary users, or by users sending data with a lower QoS requirement. Such secondary users will be continually listening and searching for such a signature. Once the signature is detected, secondary users adjust their transmission parameters accordingly, or stop their transmission altogether and continue with the remaining part at a later time when the network becomes once again available to them. Parameters of the periodic signal can be used to identify different classes of users, or convey some critical information.

To describe the systems and methods a basic setup is employed. For this purpose, aspects relevant to supporting multiple clients and networking are described assuming OFDMA. However, techniques herein will be applicable if OFDMA is replaced by some other known alternatives, e.g., CDMA, OFDM-CDMA, Direct Sequence (DS)-CDMA, Time-division Multiple Access (TDMA), constellation construction/transmission in time with pulse shaping and equalization, Space Division Multiple Access (SDMA), and their possible combinations.

Figure 2:
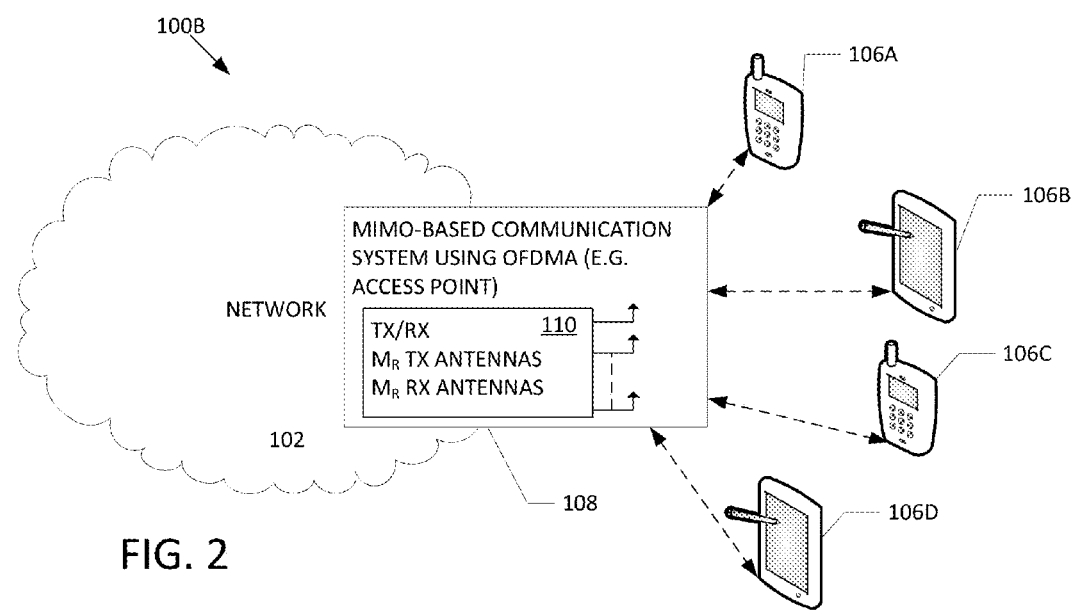
Figure 3:
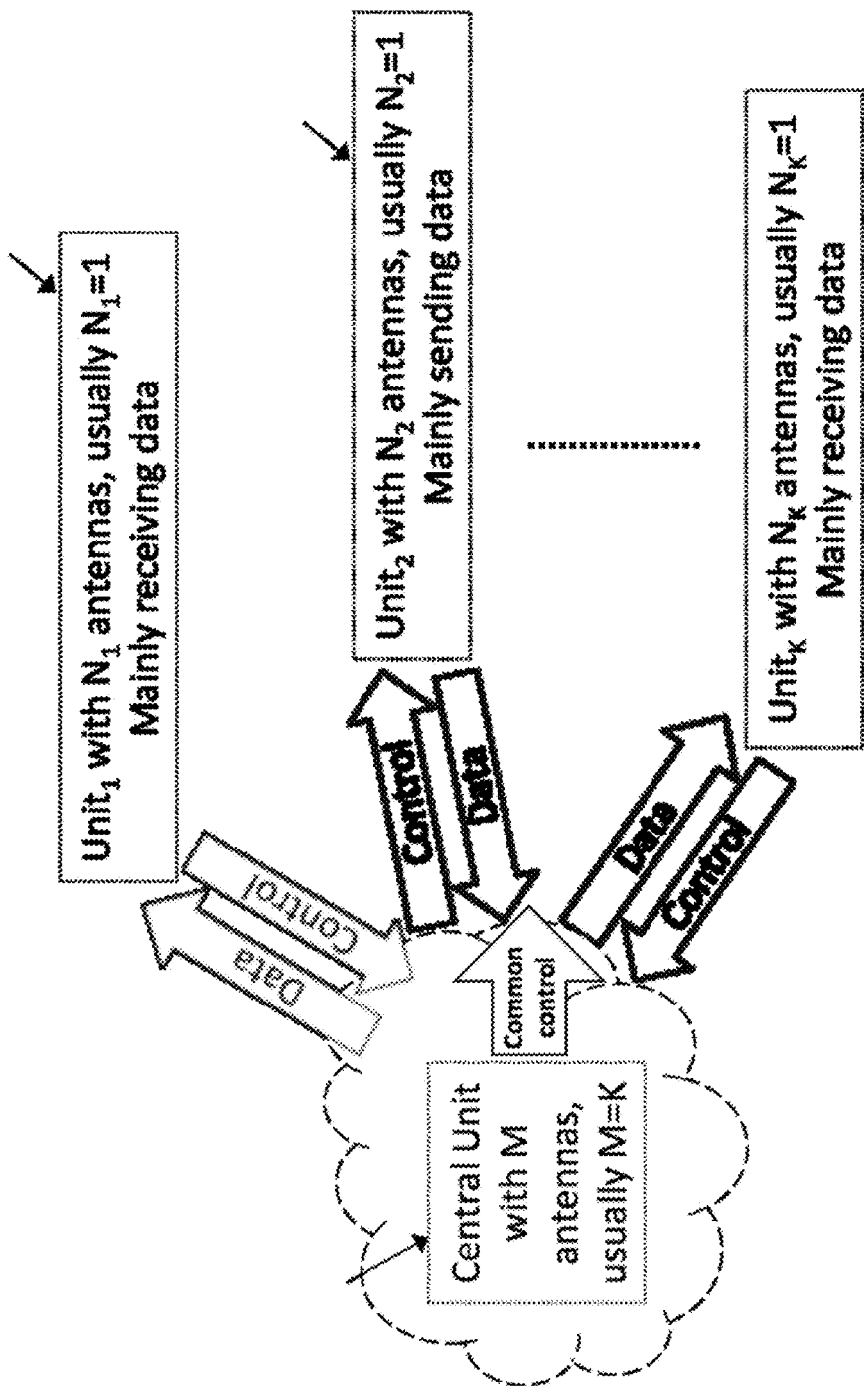
FIG. 3 is a block diagram showing cooperative communications 20 between a central wireless communications device 200 and K other devices, 201, 202, ... (Unit$_1$-Unit$_K$)

FIGS. 2 and 3 show block diagrams of respective full duplex communication networks 100A and 100B, albeit simplified, in which an access point (AP) (e.g. 104 or 108) is communicating with multiple clients (106A, 106 B 106C and 106D) with full-duplex links to each client. Access point 108 of FIG. 2 communicates with multiple clients using OFDMA for sharing the bandwidth among users with full-duplex links over each OFDM tone and with support for multiple transmit and multiple receive antennas 110 (e.g. N×N). Though described as access points, the components 104 and 108 may be configured as base stations (BS) or other communication components such as relays, range extenders, wireless terminals, and wireless nodes involved in ad hoc or wireless mesh networks.

This disclosure encompasses systems and methods wherein signals for control of Physical Layer (PHY) operations are communicated in parallel with the flow of data. In particular, one of the nodes inserts pilots in its transmit signal to help in synchronizing distant nodes. As another example, transmitting nodes can simultaneously listen to a common synchronizing pilot sent by an external nodes, such as a satellite, and use it towards forming a coherent distributed/co-operative scheme, such as Interference Alignment or distributed MIMO, with support for joint detection of separately encoded messages. In particular, this technique can be applied to interference channel, and to MIMO multiple access channel. In the case of SDMA in MIMO broadcast channel, the central node sends a pilot in downlink to synchronize all its client nodes, and each of the client nodes uses part of its up-link channel to feedback its corresponding channel state. In the case of SDMA in MIMO uplink, the central node sends a pilot in downlink to synchronize all its client nodes.

FIG. 2 is a block diagram showing cooperative communications 200 between a central wireless communications device 200 and K other devices (Unit1-UnitK). Central unit has M multiple antennas, typically where M=K. There is established 2K virtual pipes of data/control communications over the same time/frequency where control communications include reference for time/frequency/clock synchronization, channel gain/phase, information for user selection and channel inversion in SDMA, beam-forming vectors, beam-forming gains, channel matrix in MIMO, ARQ, power control, instruction for adaptive coding and modulation, etc. In SDMA down-link, main data flow is out of central unit, while in SDMA uplink most data flow is into the central unit. Common control is used by all nodes in the network and in particular includes reference for time/frequency/clock synchronization. Such a common reference for time/frequency/clock enables all the units to be globally synchronized, instead of local synchronization, which is used in traditional alternatives using half-duplex links. This is particularly important in the SDMA uplink, in which case all transmitting nodes can locally deal with any mismatch they may have with the central receiving node prior to transmission, and this can be achieved without the need for feedback. Note that in traditional half-duplex links such mismatches are usually measured and compensated in the receiver side. This would not be possible in the SDMA uplink due to the reason that the common receiver would usually have different mismatches with different transmitters and consequently would not be able to compensate for all of them. If SDMA uplink is based on half-duplex links, the only option would be to feedback the measured mismatches to their respective transmitting nodes to be compensated prior to transmission. However, this would require complicated signaling and use of feedback. These problems are avoided using full-duplex links and methods explained above. Although this feature is explained in terms of SDMA, similar strategy could be used to solve similar problems in the case of interfering nodes by enabling global synchronization at the transmitters' sides.

It is desirable that new clients, through sending request-to-join signal, can join an existing network without prior co-ordination. Exploiting full-duplex capability, the Base-Station (BS) or Access Point (AP) can continually monitor its incoming signal in search for such a request-to-join signal. Once such a signal is detected, the node allocates resources to the new client and synchronizes it with the rest (i.e., synchronization within the cyclic prefix of the underling OFDM).

To handle asynchronous clients, receiving node (e.g., AP) will be always listening to detect a valid request-to-join signal, while supporting full-duplex connections to its current clients. In one embodiment, several repetitions of a sequence (i.e., several periods of a periodic sequence) are used as the request-to-join signal. Once such a signal passes through the linear system corresponding to the channel, it results in an almost periodic sequence of the same period. This can be detected at the receiver end by using a simple correlation calculation by sliding two consecutive windows of the length of that period, shifting them through the incoming signal sample by sample, and computing the inner product of the vectors within the two windows. This produces a peak when the periodicity starts, and this peak will continue until the periodicity lasts. It should be ensured that the remaining amount of self-interference does not cause complete loss of this correlation peak. Note that correlation calculation on its own provides a significant boost in signal to noise.

The possibility of supporting two-way links with multiple (initially asynchronous) clients helps with many of the current challenges of wireless networks (cellular and WLAN). Examples are problems of Multiple Access Control (MAC), resource allocation, Quality of Service (QoS), co-operative communications, interference management and scheduling.

Access to a return channel can be used in part (e.g., by allocating a subset of OFDM tones) to facilitate control signaling. This includes sending pilots for time and/or frequency synchronization, ARQ, power control, adaptive coding and modulation, etc. An important usage scenario in this category is the case of co-operative signaling. In recent years, there have been significant work on setups like broadcast channel, multiple access channel and interference channel. Time and frequency synchronization in such setups is a major issue. Access to full-duplex links can facilitate practical implementation of such setups. In one embodiment, one node broadcasts a set of pilots to be used by all network nodes as a reference for their carrier. Another embodiment concerns a scenario that a large number of transmit antennas, each with low transmission power, are used to perform beam-forming in phase and/or polarization for a receiver which has a small number, and in particular, a single antenna.

Access to a return channel also enables the receiver to periodically feedback the channel state (phase, magnitude and/or polarization) corresponding to each transmit antenna to be used by the multiple antenna transmitter for beam forming. This setup can be used to reduce transmit power, and in particular is useful in scenarios that transmit power is limited due to regulatory considerations. In another embodiment, transmitting nodes gather an indication of the amount of interference in different frequency bands through listening while transmitting, and adjust their transmission parameters accordingly.

Possibility of supporting two-way links solves many of resource allocation and scheduling issues that are currently prominent bottlenecks in cost effective and efficient realization of wireless networks. This disclosure includes methods wherein interfering nodes, by listening to each other while transmitting, can form a distributed collaborative signaling scheme. For example, in the case of two-user Interference Channel (IC), the two transmitting nodes can listen to each other during one symbol and then form a distributed space-time code, e.g., an Alamouti code, in the next symbol. This can be achieved by listening to several symbols gathered in a coded block and use this information (after partial or complete decoding of the coded block) to help in the following block(s). Likewise, the two transmitting nodes can listen to each other during one coded block and then form a distributed Alamouti code in the next block. Such setups can be also useful in multiple access scenarios, e.g., when two clients send data to an access point. As an alternative to Alamouti code, transmitter/receiver nodes can adjust their transmission/detection strategies such that each receiver detects its own message, rather than detecting both messages. In the case that the receiver nodes are also full duplex, it is possible to base the second phase (collaboration phase) on either the transmitter (as above) or the receiver. In other words, during the collaboration phase, either or both receivers relay their received message to the other receiver. This feature increases the achieved diversity gain. For example, in the case of two-user interference channel composed of interfering links T1→R1 and T2→R2, the following configurations can be used in the collaboration phase (T1,T2), (T1,R1), (T1,R2), (T2,R1), or (T2,R2).

The above cooperative setup can be used in the case of a multiple access channel (the two nodes send data to the same access point). In a more general setup that multiple transmitter/receiver pairs share the spectrum, once a node has access to a data symbol relevant to the other node(s), it can decide to activate its transmitter to relay the received signal within the OFDM cyclic prefix, while continuing to listen to subsequent incoming signals. This feature can be used to enhance diversity, or save energy through relaying operation (when the relaying nodes enjoy good outgoing channel conditions).

Figure 4:
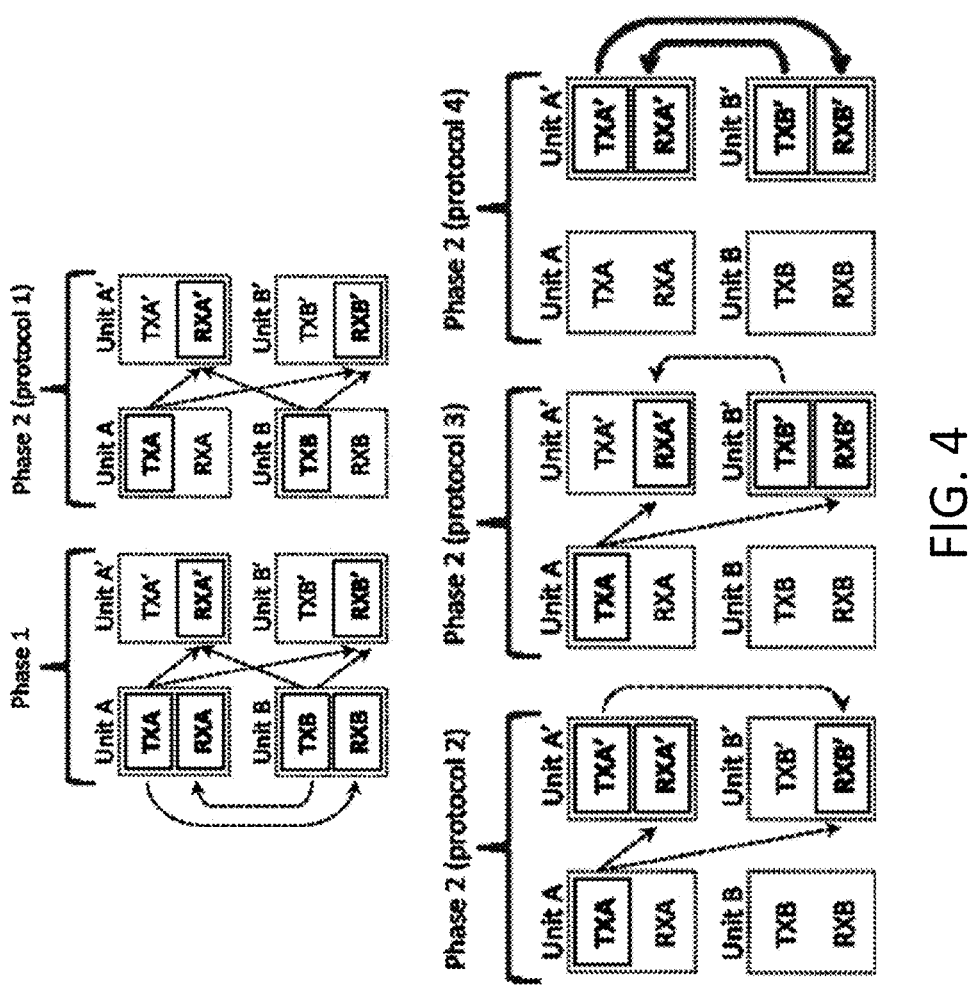
FIG. 4 depicts block diagrams showing cooperative communication in accordance with one example. Unit A has a message intended to be sent to Unit A' and Unit B has a message intended to be sent to Unit B'.

FIG. 4 are block diagrams showing cooperative communication in accordance with one example. Unit A has a message intended to be sent to Unit A' and Unit B has a message intended to be sent to Unit B'. All receivers hear transmitters. In a phase 1, transmitters in subunits in A and B transmit their respective messages. This may include a single transmission, or a coded block protected by Forward Error Correction (FEC). A phase 2 of co-operation starts after phase 1. All receivers hear transmissions in phase 1 and phase 2, but a selected subset of receivers will be active and listen to the incoming signal. In FIG. 4, subunits specified in smaller boxes with bold-ace fonts specify subunits that are active in phase 1 and phase 2, either as transmitter or as receiver. Direction of arrows in FIG. 4 show the flow of information in the sense of specifying, which receive subunit, is listening to which transmit subunit. In phase 2, two transmit subunits and two receive subunits are active. Active receive subunits are on the receive side, but active transmit subunits can be on either sides depending on the quality of their received signal in phase 1, which in turn is dictated by the channel gains and respective signal-to-noise ratios in phase 1. This results in 4 protocols for phase 2 as shown in FIG. 4. A decision about which of these protocols should be followed in phase 2 can be made by a central node, which informs all the units of the policy to be used. Such a policy can be revised in periods determined by how fast the channel conditions are changing. As mentioned earlier, phase 1 can be as short as a single transmission, and as long as a coded block protected by FEC. Correspondingly, phase 2 will operate on the single symbol, or on the coded block. Phase 2 can relay the noisy signal, or perform complete or partial decoding to remove or reduce the effect of the noise. To reduce or remove noise, this operation involves hard decision, soft decision or soft output decoding. Accordingly, transmission policy of each transmit subunit active in phase 2, say in terms of transmit energy, can be locally optimized according to the instantaneous quality of the corresponding received signal in phase 1. These local adjustments to policy will be complementary to the global policy determined by the central node.

Traditional wireless networks rely on two types of links for exchange of two types of information, namely data and control. One type is to handle the main bulk of data to be communicated (data link) and another type is to handle various control information (control link). Data link is usually of high throughput, and control link is usually of low throughput. A major bottleneck is to establish the control link in a timely manner without causing too much disturbance on the network operation. In current half-duplex networks, data and control links are established either using different frequency bands, or using different time slots. Existing solutions based on frequency division duplex are usually expensive, and existing solutions based on time division duplex are usually inefficient. For example, in 802.11, which is based on time division duplex, a new node which wants to transmit information (data or control) has to wait until channel is idle. This is called Carrier Sense Multiple Access (CSMA) and is the main source of poor efficiency in 802.11. With the wide spread use of smart phones, this problem is expected to become more severe. The reason is that as smart phones move in areas covered by 802.11, they can easily get disconnected from their current access point and subsequently try to get associated with another access point and this requires significant control signaling. Ironically, in most cases, the moving smart phones do not have any actual data to send or receive, but their control signaling usually imposes overwhelming degradations in network delay and throughput. It will be useful if low throughput control links could be established asynchronously and in parallel with high throughput data links. In an embodiment, this is achieved by overlaying a network of low throughput control links on top of the high throughput network of data links. Transmission on the Low Throughput Overlay (LTO) channel forming the control links uses signaling schemes with low power and thereby low spectral efficiency. For example, a transmitter can send several periods of a periodic signal in time domain, which can be detected by a simple correlation calculation using sliding windows. The presence of such a signal indicates incoming control data, and the amplitude and/or phase and/or duration of a basic periodic signal can be varied (with respect a starting periodic signal used as a preamble) to embed the control data. This may also include FEC with a short block length. Nodes, which are interested to participate in the overlay control network, will sense the LTO channel and transmit if the channel is idle (can possibly use a back-off strategy similar to CSMA protocol used in 802.11). To avoid collisions, there is provided a manner to indicate occupancy of the LTO channel which shares (is overlaid on top of) the spectrum used for the main data network. Main data links operate with relatively higher power over the High Throughout Main (HTM) channel. Using methods described herein, this is achieved by searching for the basic periodic signal as a sign of LTO channel being idle or occupied. Nodes involved in signaling over HTM channel can first search for the LTO signal, perform signal detection on it, and then (partially or fully) cancel the LTO signal to reduce its harmful effect on the HTM channel. There is provided a method, in the context of handing asynchronous clients, to establish a framework to implement the above setup of an LTO channel working asynchronously and in parallel with the HTM channel without significantly degrading the HTM channel due to the inherent interference between LTO and HTM channels due to the sharing of spectrum.

Figure 5:
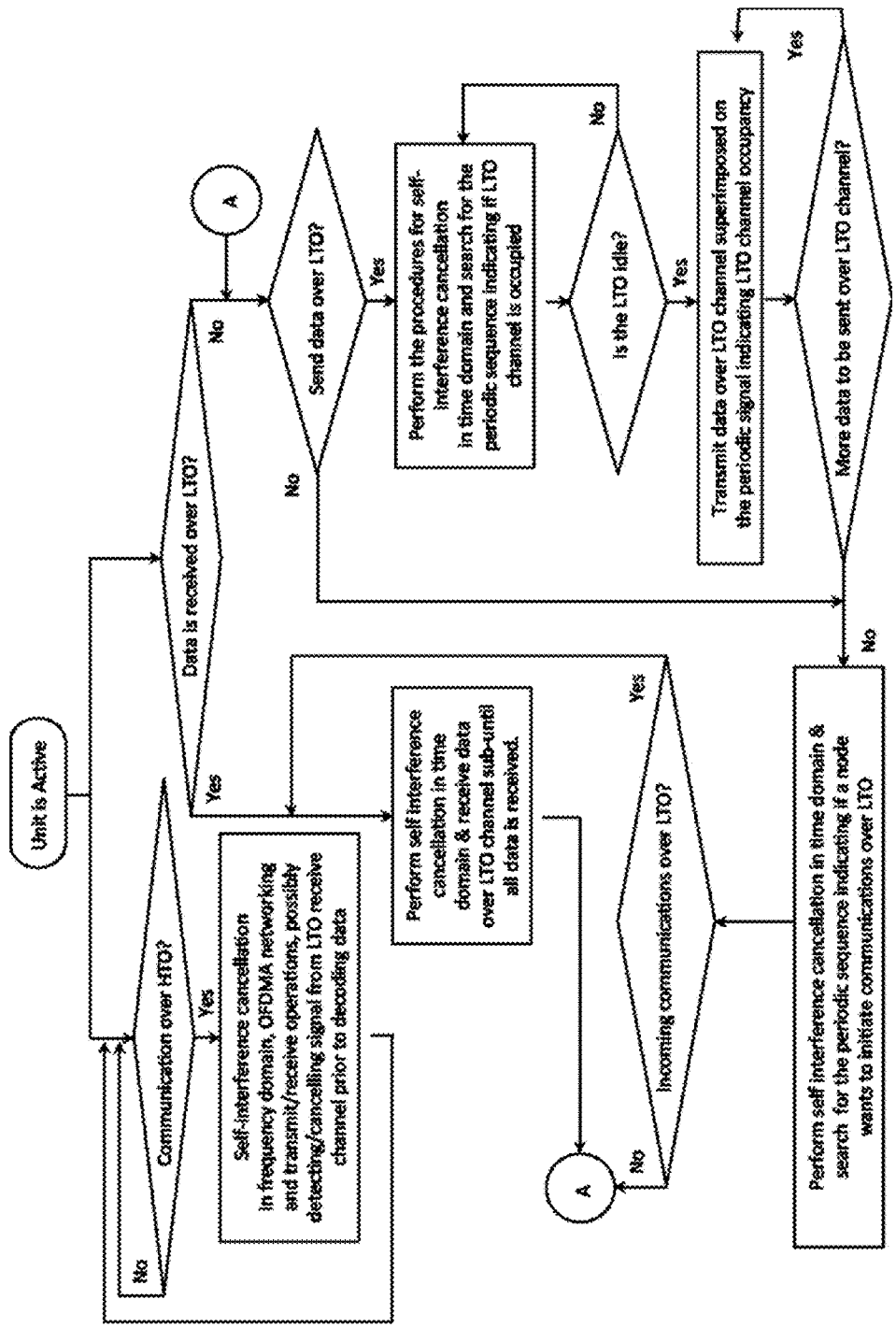
FIG. 5 is a flowchart showing a method with operations 400 for a wireless communication device for establishing and/or handling communications over a Low Throughput Overlaid (LTO) channel asynchronously and in parallel (i.e. with overlap in time and frequency) with communications over a Higher Throughput Main (HTM) data channel in accordance with one embodiment.

FIG. 5 is a flowchart showing a method with operations 400 for a wireless communication device for establishing and/or handling communications over an LTO channel asynchronously and in parallel with communications over an HTM data channel in accordance with one embodiment. It will be understood that operations 402-404 relate to HTM data channel communications and operations 406-422 relate to LTO channel communications. Respective operations may be performed by respective subunits of the wireless communication device. FIG. 5 applies to either access point, or client. In particular any unit which may get involved in ad-hoc or mesh networking should have equal capabilities in this respect. However, in a simple network setup, clients may use the LTO channel in the uplink to announce their presence, and then listen for response from the AP in the HTM channel.

At 402, a determination is made whether the communications are over the HTO. If no operations return to the start of operations 400. If yes, operations perform self-interference cancellation in frequency domain, OFDMA networking and transmit/receive operations, possibly detecting/cancelling signal from LTO receive channel prior to decoding data.

At 406, a determination is made whether data is received over LTO channel. If yes, at 408, operations perform self-interference cancellation in the time domain and receive data via the LTO channel until all data is received. If data is not received, there may be data to send over the LTO channel (determination at 410). If yes, at 412, operations perform self-interference cancellation in the time domain and search for the periodic sequence indicating if the LTO channel is occupied. At 414 operations determine whether the LTO channel is idle (i.e. available for the communication device). If no, operations return to 412 to try again. If yes, at 416 data is transmitted over the LTO channel superimposed on the periodic signal indicating LTO channel occupancy. At 418, a determination is made whether more data is to be sent over the LTO channel. If yes, operations return to 416. If not, at 420 the device performs self-interference cancellation in the time domain and searches for the periodic sequence indicating if another node (device) wants to initiate communications over the LTO channel. If at 422 there is no incoming communication over the LTO channel, operations may continue at 410. If yes, operations continue at 408 as previously described.

In the context of IC, this disclosure includes methods to cancel the interference at a receiving node through filtering and super-imposing/relaying of the received signal. This feature makes it possible to achieve a multiplexing gain of one in a two-user IC, which is in contrast to the limit of ½ using traditional half-duplex radios. In particular, there is presented a setup in which each transmitter listen to the incoming signal and forwards it (after proper filtering in time domain) to its respective receiver (on top of the desired signal) such that it cancels the interference signal arriving through the cross link. To realize such a cooperative scheme, one needs to account for the delay in exchanging information between transmitters. Methods described herein use a minimum delay dictated by the channel memory as captured in OFDM cyclic prefix. In contrast, in the literature based on using a discrete time model for the underlying channels, the minimum delay for cooperation is assumed to be limited to at least one symbol interval in the discrete time axis. Relying on such a discrete time model limits the potential gain due to such collaborations. The embodiments herein handle the minimum delay requirement at a finer level of granularity. This exploits the fact that tolerance to transmission delay is governed by OFDM cyclic prefix, which is larger than the minimum delay requirement for cooperation as governed by the underlying filtering/relaying operation.

Figure 6:
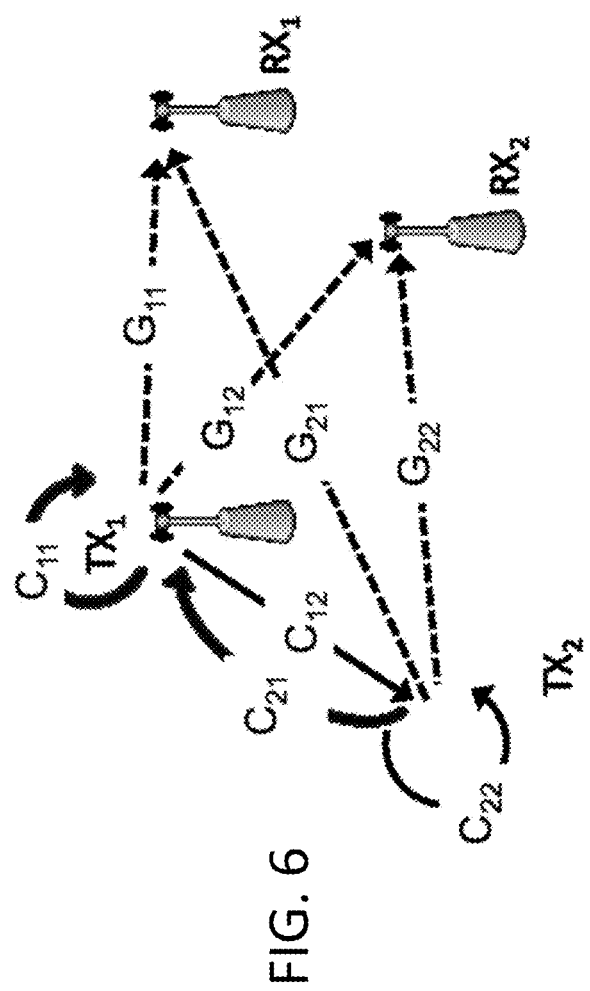
FIG. 6 shows a schematic view of units operating in the same frequency band, which filter and super-impose/forward the signal received from each other to cancel (pre-compensate) the interference at their intended receiver.

Another embodiment for the application of full-duplex link is a basic interference channel (FIGS. 6 and 7) where there are transfer functions G11, G12, G21, and G22 from the transmitters to the receivers, C12, C21 for the links between them, and C11, C22 for the self-interference of each transmitter to itself In this setup, there is an interference channel that the transmitters want to collaborate and reduce the effect of their mutual interference. In Information Theoretical approaches, such a collaboration is based on the assumption that transmit units require to wait for one symbol (collaboration is restricted to have a delay of at least one symbol). However, the methods herein exploit the observation that relative delays within OFDM cyclic prefix (capturing channel memory) are acceptable. Relying on this observation, to cancel the interference at the distant receiver, transmitters TX1 and TX2 apply a filter (in time domain) in the base-band of their receive chain, and forward the signal from the other node superimposed on their own signal such that it cancels the interference coming from the cross link. Receive filters should have the following expressions:

$$R_1 = \frac{G_{21}}{G_{21}C_{11} - G_{11}C_{21}}$$

and $$R_2 = \frac{G_{12}}{G_{12}C_{22} - G_{22}C_{12}}$$

Figure 7:
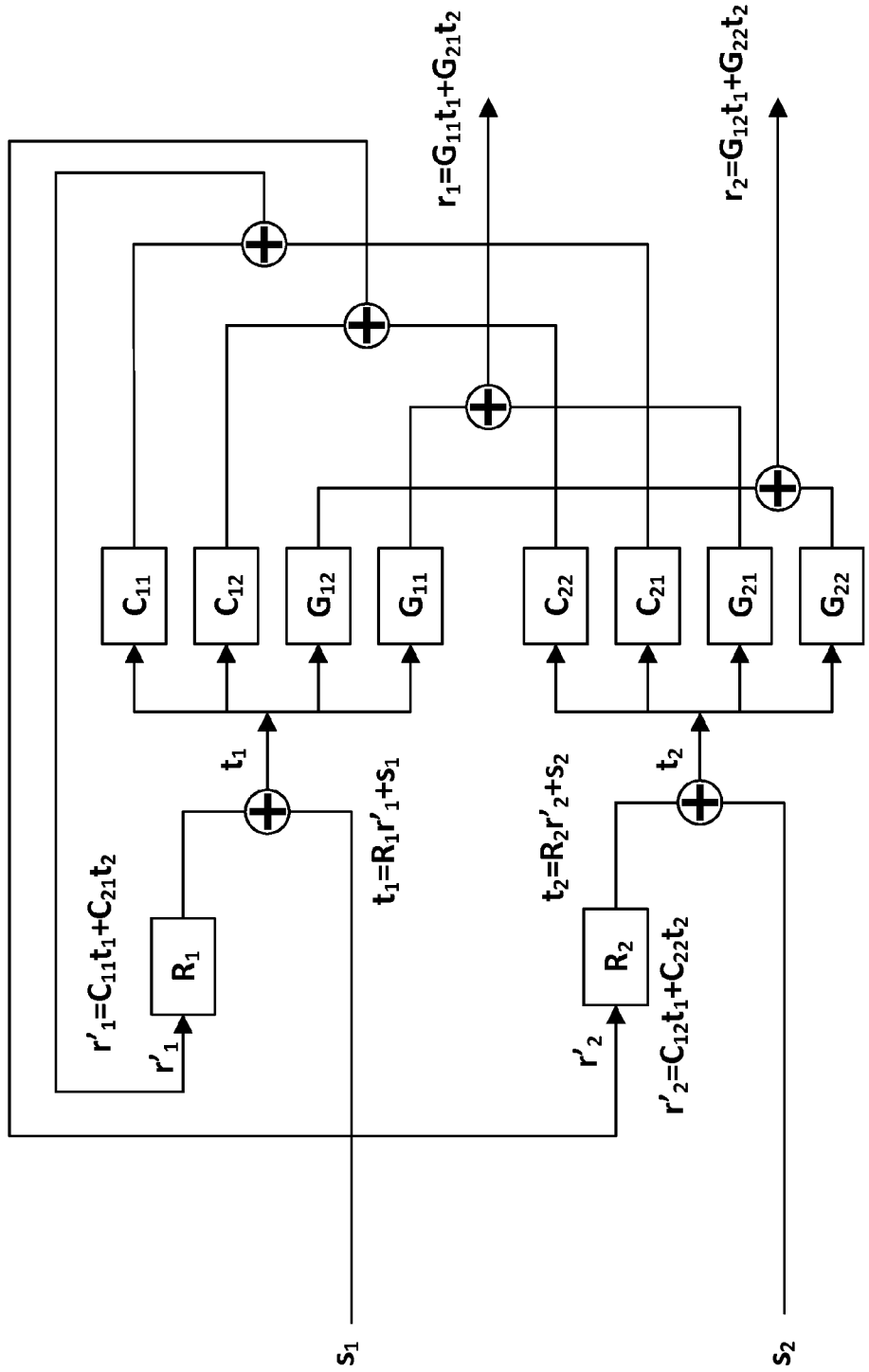
FIG. 7 shows a more detailed schematic view of units operating in the same frequency band, which filter and super-impose/forward the signal received from each other to cancel (pre-compensate) the interference at their intended receiver.

Note that using such filters increases the transmit energy and thereby results in decreasing the signal to noise ratio, but it will cancel the interference, and consequently, the multiplexing gain is 1 instead of 0.5 which is the limit for interference channel with half-duplex links. FIG. 7 shows a more detailed schematic view of units operating in the same frequency band, which filter and super-impose/forward the signal received from each other to cancel (pre-compensate) the interference at their intended receiver. Accordingly:

$$t_1 = R_1 r'_1 + s_1$$

$$t_2 = R_2 r'_2 + s_2$$

$$r'_1 = C_{11} t_1 + C_{21} t_2$$

$$r'_2 = C_{12} t_1 + C_{22} t_2$$

$$r_1 = G_{11} t_1 + G_{21} t_2$$

$$r_2 = G_{12} t_1 + G_{22} t_2$$

FIG. 7 models the above operations in base-band wherein s1 and s2 are information-bearing signals aimed from each transmitter to its respective receiver.

Another aspect of this disclosure concerns the situation that some or all the control signaling can affect the propagation environment in small increments. In this case, relying on a full duplex link, this disclosure includes methods to form a closed loop between a transmitter and its respective receiver wherein the control signals (affecting the channel impulse response) are adjusted relying on closed loop feedback, e.g., using methods known in the context of adaptive signal processing. Channel impulse response can be changed by modifying the RF properties of the environment external, but close, to the transmit and/or receive antenna(s). The criterion in such adaptive algorithms can be maximizing desired signal, and/or minimizing interference, and/or increasing frequency selectivity for diversity purposes. In such a setup, stability may be compromised due to closed loops. These are one local loop at each node (between transmitter and receiver in the same node due to the remaining self-interference) and the third one is the loop formed between transmitter/receiver of one node and receiver/transmitter of the other node. It should be clear to those skilled in the area that transmit gain, receive gain and gains in local loops of the two units can be adjusted to avoid such undesirable oscillations.

In some embodiments, a method of operating a wireless communication network for establishing communication between a Central Node, e.g., Access Point (AP), Basestation (BS), and respective multiple clients with two-way wireless links, i.e., complete or partial overlap in time as well as in frequency, the wireless communication node comprising a Multiple-Input Multiple-Output (MIMO) antenna system, the method comprising:

1) a new client is allowed to send a request-to-join signal without prior coordination, and with overlap in time and frequency with the existing clients, and wherein,
2) central node is continually listening to detect a valid incoming request-to-join signal, or other forms of control signaling, of any client while communicating with the multiple clients of the existing network using full-duplex connectivity for both data and control flow, and wherein
3) a first stage of base-band self-interference cancellation is followed by an algorithmic base-band block, which works synchronously with the transmit signal of a central node A to detect the request-to-join signal and subsequently trigger a sequence of operations required for the node B to join the network associated with node A, or perform other network management operation such as bandwidth allocation and scheduling.

Alternative embodiments may include multiple clients connected to the central node sharing a common spectrum using Orthogonal Frequency Division Multiple Access (OFDMA). The method may include neighboring nodes, by listening to each other while transmitting, collaborating in the subsequent transmission symbol(s), or collaborate in subsequent transmission block(s). The method may include the use of part of a return link as a control channel to, at least one of:

1) send pilots for synchronization;
2) coordinate retransmission of erroneous frames in ARQ without severely interrupting a forward link;
3) coordinate adaptive coding and modulation and power control based on the quality of the forward link, e.g., using channel gain or features of observed multi-user interference across frequency;
4) feedback the channel state (phase, magnitude, polarization) in an asymmetric link wherein transmitter node posses many antennas and rely on beam-forming in terms of channel state (phase, magnitude, polarization) to achieve high reliability with low transmit energy (e.g., below noise level); and,
5) feedback features of its received signal to improve the capacity of the forward link in an interference channel.

The method of some further embodiments may include a central node using part of a forward link to broadcast a common pilot to be used by other nodes for synchronization and thereby enabling joint decoding in a multiple access channel or in an interference channel. Further embodiments may use a MIMO-SDMA network environment wherein part of a return link from each receiver node is used to periodically feedback its corresponding channel state, and wherein part of a forward link from a main transmitter node is used to periodically broadcast a common pilot for synchronization. The methods of further embodiments include a network environment wherein nodes periodically listen while transmitting to measure features of their observed multi-user interference terms, for example energy of interference in different frequency segments, and accordingly adjust their transmit/receive strategies.

Embodiments may also include methods described above used in a network environment wherein a plurality of nodes filter and forward respective receive signals by super-imposing on the respective transmit signals of each respective node such that the corresponding interference term(s) at the respective intended receiver for a node is cancelled. The methods may use a 2-user interference channel wherein a transmit and/or a receive node filter and forward their received signal, including through super-imposing it on their transmit signal if applicable, to cancel the multi-user interference at either or both of receiving nodes. The method may be generalized to more than 2 interfering nodes, wherein transmit and/or receive nodes rely on multiple antennas in order to cancel the multi-user interference terms from several interfering nodes.

Further methods may be used in a cognitive transmission network, wherein
1) primary users are distinguished by a signature signal, e.g., a periodic preamble, to be sent at the beginning of their transmission, and wherein
2) primary users start transmission without attention to the channel occupancy by the secondary users,
3) secondary users will be continually listening and searching for the signature of the primary users, and, wherein
4) secondary users adjust their transmission parameters once the signature of the primary users is detected, e.g., stop their transmission and continue with the remaining part at a later time when the network becomes once again available to secondary users.

Additional methods may be used in a cognitive network, wherein
1) users are distinguished by a signature signal according to their class of service, e.g., CDMA codes which are superimposed on their main signal, and wherein
2) users check for the channel occupancy, detect the class of the users using the channel, and adjust their transmission strategy accordingly.

An embodiment includes a method for overlaying a network of Low Throughput Control (LTC) links on top of the High Throughput Main (HTM) data links with overlap in time and frequency, and wherein, to enable cancellation on the HTM channel, transmission on the LTO channel uses signaling schemes with low power and thereby low spectral efficiency.

These methods may be used where,
1) an LTO transmitter sends several periods of a periodic signal in time domain, which are detected by a correlation calculation using sliding windows, and wherein
2) the presence of such a signal indicates incoming control data, and wherein
3) the amplitude and/or phase and/or duration of a basic periodic signal are varied (with respect a starting periodic signal used as a preamble) to embed the control data, and wherein
4) data on LTO includes Forward Error Correction (FEC) with a short block length.

To avoid collisions, some of the above methods may use:
1) an overlaid signature signal is used to indicate occupancy of the LTO channel, and wherein
2) nodes which are interested to participate in the overlay control network will sense the LTO channel and transmit if the channel is idle, e.g., by searching for the basic periodic signal as a sign of LTO channel being idle or occupied, and wherein
3) LTO links use a back-off strategy, e.g., similar to the CSMA protocol used in 802.11, among themselves, and wherein,
4) HTM links operate with relatively higher power, and wherein,
5) nodes involved in signaling over HTM links first search for the LTO signal, detect its timing and synchronize with it, perform signal detection on it, and then (partially or fully) cancel the LTO signal to reduce its harmful interference effect on their respective HTM link.

Further methods may rely on a full duplex link to form a closed loop between a transmitter and its respective receiver, wherein the control signals (affecting the channel impulse response) are adjusted relying on closed loop feedback, e.g., using methods known in the context of adaptive signal processing.

Many of the methods described above may be used even where at least one of the clients does not have full-duplex capability.

Still further embodiments include a wireless communication node configured to perform a method according to any one of the previous method claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
   in a full duplex transceiver, transmitting from a transmit antenna, a first transmit message to a distant first receiver while simultaneously receiving a first receive message from a second full duplex transceiver, wherein the first receive message is intended for a second receiver, and wherein the first transmit message and the first receive message overlap in frequency;
   applying a filter at least to the first receive message to generate a filtered first receive message, wherein the filter is selected such that the transmission of the filtered first receive message at least partially cancels the first receive message at the first receiver and wherein the filter is based at least in part on a first transfer function between the full duplex transceiver and the first receiver and a second transfer function between the second full duplex transceiver and the first receiver; and transmitting from the transmit antenna, a superposition of the first transmit message with the filtered first receive message while continuing to receive the first receive message.

2. The method of claim 1 wherein the first transmit message is a first coded block of data and the first receive signal message is a second coded block of data.

3. A method comprising:
   in a first full duplex transceiver, transmitting a first message to a first distant receiver while simultaneously receiving a second message from a second full duplex transceiver, wherein the second message is intended for a second distant receiver, and wherein the first message and the second message overlap in frequency;
   in the second full duplex transceiver, transmitting the second message to a second receiver while simultaneously receiving the first message from the first full duplex transceiver;
   in the first and second full-duplex transceiver, receiving transmission policy information and responsively forming a distributed space-time code from the first message and transmitting the distributed space-time code from the first and second full duplex transceivers in a next time duration, wherein the transmission of the distributed space-time code includes relaying a noisy version of the first message, and is based on either a completely decoded or partially decoded first message to remove or reduce the effect of the noise.

4. The method of claim 3 wherein, to reduce or remove noise, the decoding is based on one of: hard decision decoding, soft decision decoding or soft output decoding.

5. The method of claim 3, wherein the space-time code is a distributed Alamouti code.

6. An apparatus comprising:
   a full duplex transceiver having a transmitter and a transmit antenna, configured to transmit a first transmit message to a distant first receiver;
   the full duplex transceiver having a receiver configured to simultaneously receive a first receive message from a second full duplex transceiver, wherein the first receive message is intended for a second receiver, and wherein the first transmit message and the first receive message overlap in frequency;
   a filter within the full duplex transceiver configured to filter the first receive message and to generate a filtered first receive message, wherein the filter is selected such that the transmission of the filtered first receive message at least partially cancels the first receive message at the first receiver and wherein the filter is based at least in part on a first transfer function between the full duplex transceiver and the first receiver and a second transfer function between the second full duplex transceiver and the first receiver; and
   wherein the transmitter is configured to transmit from the transmit antenna, a superposition of the first transmit message with the filtered first receive message while continuing to receive the first receive message.

* * * * *

UNITED STATES PATENT AND TRADEMARK OFFICE
CERTIFICATE OF CORRECTION

PATENT NO. : 9,763,104 B2
APPLICATION NO. : 13/893299
DATED : September 12, 2017
INVENTOR(S) : Amir Keyvan Khandani It is certified that error appears in the above-identified patent and that said Letters Patent is hereby corrected as shown below:

In the Drawings

Sheet 2, Fig. 3, the reference numeral 200 should be applied to the element beginning with "Central Unit with M antennas..."; the reference numeral 201 should be applied to the element beginning with "Unit1 with N1 antennas..."; the reference numeral 202 should be applied to the element beginning with "Unit2 with N2 antennas"

Sheet 4, Fig. 5, reference numerals should be applied to the elements in the figure as follows: apply 402 to the element labeled "Communication over HTO?"; apply 404 to the element labeled "self-interference cancellation in frequency domain, OFDMA networking and transmit/receive operations, possibly detecting/cancelling signal from LTO receive channel prior to decoding data"; apply 406 to the element labeled "Data is received over LTO?"; apply 408 to the element labeled "Perform self-interference cancellation in the time domain & receive data over LTO channel until all data is received."; apply 410 to the element "Send data over LTO?"; apply 412 to the element "Perform the procedures for self-interference cancellation in the time domain and search for the periodic sequence indicating if LTO channel is occupied"; apply 414 to the element "Is the LTO idle?"; apply 418 to the element "Transmit data over LTO channel superimposed on the periodic signal indicating LTO channel occupancy"; apply 418 to the element "More data to be sent over LTO channel?"; apply 420 to the element "Perform self interference cancellation in time domain & search for the periodic sequence indicating if a node wants to initiate communications over LTO"; apply 422 to the element "Incoming communications over LTO?"

In the Specification

Column 1, Line 16, the application Ser. No. "13/893,298" should read --13/893,288--
Column 3, Line 48, the text "FIGs. 2 and 3" should read --FIGs. 1 and 2--
Column 4, Line 14, the text "FIG. 2" should read --FIG. 3--
Column 4, Line 15, the reference numeral "200" should read --20--
Column 7, Line 24, the text "throughout" should read --throughput--
Column 7, Lines 47-48, the text "Throughout" should read --Throughput--

Signed and Sealed this
Eleventh Day of June, 2019

Andrei Iancu
*Director of the United States Patent and Trademark Office*

Column 8, Line 15, insert the reference numeral --404-- after the text "decoding data"
Column 11, Line 45, the text "Throughout" should read --Throughput--
Column 11, Line 46, the text "Throughout" should read --Throughput--